(12) United States Patent
Chen

(10) Patent No.: US 12,136,694 B2
(45) Date of Patent: Nov. 5, 2024

(54) BATTERY, ELECTRIC APPARATUS, AND CELL INSTALLATION METHOD

(71) Applicant: Huawei Digital Power Technologies Co., Ltd., Shenzhen (CN)

(72) Inventor: Jun Chen, Dongguan (CN)

(73) Assignee: HUAWEI DIGITAL POWER TECHNOLOGIES CO., LTD., Shenzhen (CN)

(*) Notice: Subject to any disclaimer, the term of this patent is extended or adjusted under 35 U.S.C. 154(b) by 517 days.

(21) Appl. No.: 17/478,457

(22) Filed: Sep. 17, 2021

(65) Prior Publication Data
US 2022/0006115 A1    Jan. 6, 2022

Related U.S. Application Data

(63) Continuation of application No. PCT/CN2019/127764, filed on Dec. 24, 2019.

(30) Foreign Application Priority Data

Mar. 22, 2019 (CN) .......................... 201910226392.6

(51) Int. Cl.
*H01M 10/04* (2006.01)
*H01M 4/66* (2006.01)
(Continued)

(52) U.S. Cl.
CPC ......... *H01M 10/0413* (2013.01); *H01M 4/66* (2013.01); *H01M 10/0431* (2013.01);
(Continued)

(58) Field of Classification Search
CPC ........... H01M 10/0413; H01M 10/613; H01M 10/625; H01M 10/654; H01M 10/6551;
(Continued)

(56) References Cited

U.S. PATENT DOCUMENTS

2003/0194605 A1* 10/2003 Fauteux .............. H01M 50/534
429/149
2007/0269685 A1* 11/2007 Chu .................... H01M 50/538
429/3
(Continued)

FOREIGN PATENT DOCUMENTS

| CN | 202585660 U | 12/2012 |
| CN | 203398226 U | 1/2014 |

(Continued)

*Primary Examiner* — James M Erwin
*Assistant Examiner* — John S Medley
(74) *Attorney, Agent, or Firm* — WOMBLE BOND DICKINSON (US) LLP

(57) ABSTRACT

Embodiments of the application disclose a battery. A first current collector in the battery is brought into a contact with a battery housing, so that a part of heat generated by a cell can be directly conducted to the battery housing through the first current collector. The battery includes a battery housing, a first current collector, a separator, and a second current collector. The first current collector, the separator, and the second current collector are stacked and disposed inside the battery housing. The polarities of the first current collector and the second current collector are different. The first current collector is in contact with the battery housing.

14 Claims, 13 Drawing Sheets

(51) Int. Cl.
*H01M 10/613* (2014.01)
*H01M 10/625* (2014.01)
*H01M 10/654* (2014.01)
*H01M 10/6551* (2014.01)

(52) U.S. Cl.
CPC ....... *H01M 10/613* (2015.04); *H01M 10/625* (2015.04); *H01M 10/654* (2015.04); *H01M 10/6551* (2015.04); *H01M 2220/20* (2013.01); *H01M 2220/30* (2013.01)

(58) Field of Classification Search
CPC ........ H01M 10/655; H01M 4/66; H01M 4/64; H01M 10/0431; H01M 4/70; H01M 4/72; H01M 4/75; H01M 4/80
USPC ........................................................ 429/129

See application file for complete search history.

(56) References Cited

U.S. PATENT DOCUMENTS

| | | | | |
|---|---|---|---|---|
| 2008/0102359 | A1* | 5/2008 | Kogetsu | H01M 4/661 |
| | | | | 429/129 |
| 2010/0104935 | A1 | 4/2010 | Hermann et al. | |
| 2015/0064511 | A1 | 3/2015 | Wang et al. | |
| 2017/0278642 | A1* | 9/2017 | Nagase | H01G 11/28 |
| 2017/0324125 | A1 | 11/2017 | Schoenherr et al. | |

FOREIGN PATENT DOCUMENTS

| | | | | |
|---|---|---|---|---|
| CN | 104882635 | A | | 9/2015 |
| CN | 105633306 | A | | 6/2016 |
| CN | 107482156 | A | | 12/2017 |
| CN | 108183281 | A | | 6/2018 |
| CN | 109075283 | A | | 12/2018 |
| CN | 109301256 | A | * 2/2019 | ........ H01M 10/0525 |
| CN | 109742436 | A | | 5/2019 |
| CN | 110098429 | A | | 8/2019 |
| EP | 0998765 | B1 | | 3/2008 |
| WO | 2010071370 | A2 | | 6/2010 |
| WO | 2013187685 | A1 | | 12/2013 |

* cited by examiner 20 50 30 40 10 40

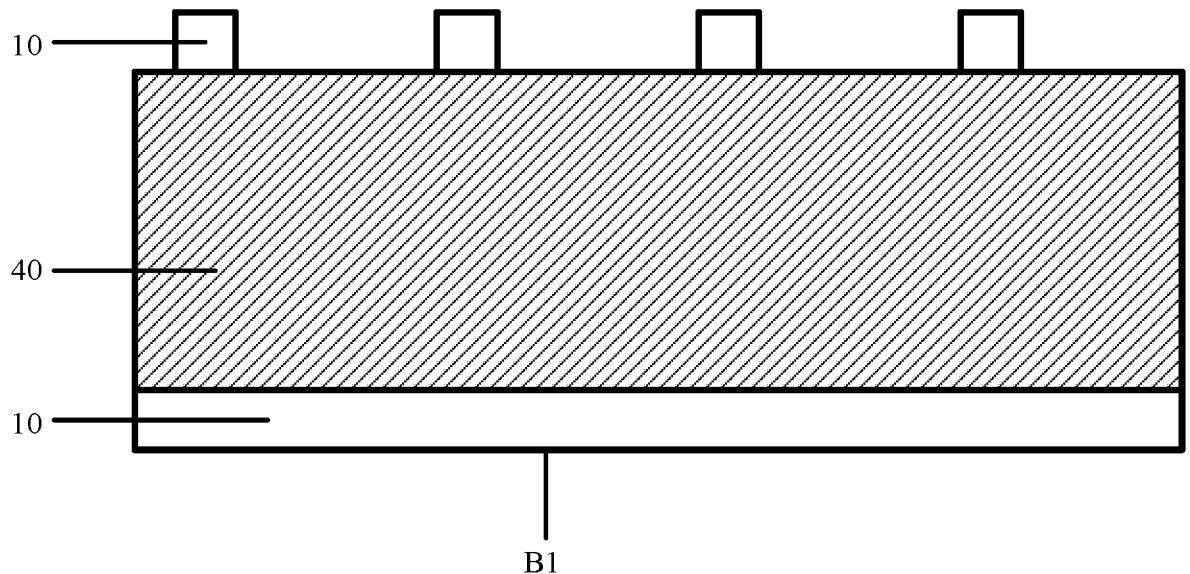

FIG. 5

Dispose a first current collector, a battery separator, and a second current collector in a stacked manner in a first direction, where the first current collector extends, in a second direction, beyond the battery separator, and the second direction is perpendicular to the first direction — 601

Fasten the first current collector, in the second direction, to a first battery end cover to form a first cell assembly — 602

Fill the first cell assembly into a first battery housing, where the first battery housing is a housing with two side openings — 603

Respectively weld the first battery end cover and a second battery end cover at the two side openings of the first battery housing, so that the first cell assembly is disposed inside the first battery housing — 604

FIG. 6

BATTERY, ELECTRIC APPARATUS, AND CELL INSTALLATION METHOD

CROSS-REFERENCE TO RELATED APPLICATIONS

This application is a continuation of International Application No. PCT/CN2019/127764, filed on Dec. 24, 2019, which claims priority to Chinese Patent Application No. 201910226392.6, filed on Mar. 22, 2019. The disclosures of the aforementioned applications are hereby incorporated by reference in their entireties.

TECHNICAL FIELD

The application relates to the field of power batteries, and in particular, to a battery, an electrical apparatus, and a cell installation method.

BACKGROUND

Currently, power batteries, due to their advantages such as high energy density and fast charging, are widely used in scenarios such as electric cars, electric trains, or electric bicycles. In a fast charging process of a power battery, especially a power battery with high energy density, a large amount of heat is generated inside a cell of the power battery. If the heat is not conducted to a battery housing in time, the temperature of the power battery will rise rapidly, and even there is a risk of thermal runaway.

In the prior art, an end of a separator in the cell extends beyond an adjacent current collector, the separator is in direct contact with the battery housing, and there is a specific air gap between the current collector and the battery housing. In this case, a heat transfer path from an inner part of the cell to the battery housing is from the separator to the battery housing, or from the air gap to the battery housing. Because thermal conductivity of the separator and the air gap is quite low, thermal resistance in the heat transfer path from the inner part of the cell to the battery housing is quite high, which reduces heat dissipation performance of the cell.

SUMMARY

An embodiment of the application provides a battery, including a battery housing, a first current collector, a separator, and a second current collector. The first current collector, the separator, and the second current collector are stacked and disposed inside the battery housing. Polarities of the first current collector and the second current collector are different, and the first current collector is in contact with the battery housing.

An embodiment of the application provides the battery, including the battery housing, the first current collector, the separator, and the second current collector. The first current collector, the separator, and the second current collector are stacked and disposed inside the battery housing. The polarities of the first current collector and the second current collector are different, and the first current collector is in contact with the battery housing. The first current collector in the battery is brought into contact with the battery housing, so that a part of heat generated by a cell can be directly conducted to the battery housing through the first current collector. Because thermal conductivity of the current collector is quite high, heat dissipation performance of the cell is improved.

In an embodiment, the first current collector, the separator, and the second current collector are stacked in a first direction. The first current collector extends, in a second direction, beyond the separator, and the first current collector conducts, in the second direction, heat to the battery housing through contact between the first current collector and the battery housing. The second direction is perpendicular to the first direction. The battery in an embodiment is a stacked battery. The first direction may be a direction perpendicular to a plane on which the first current collector is located, and the second direction may be a direction parallel to the plane on which the first current collector is located. In an embodiment of the application, if the first current collector is a positive electrode current collector, the second current collector is correspondingly a negative electrode current collector; or if the first current collector is a negative electrode current collector, the second current collector is correspondingly a positive electrode current collector. In an embodiment, the first current collector extends, in the second direction, beyond the separator, that is, a spacing is reserved, in the second direction, between the separator and the battery housing, and the first current collector is, in the second direction, in contact with the battery housing, so that heat radiated from an inner part of the cell is not conducted through the separator, but is directly conducted to the battery housing through the first current collector instead. Because the thermal conductivity of the current collector is much higher than that of the separator, the heat dissipation performance of the cell is improved.

In an embodiment, the first current collector is coated with an active substance, and a coating range of the active substance on the first current collector does not extend, in the second direction, beyond the separator. In an embodiment, to increase thermal conductivity of a heat transfer path from the cell to the battery housing, the first current collector is, in the second direction, brought into contact with the battery housing, but the second current collector is not brought into contact with the battery housing. In this case, the first current collector extends, in the second direction, beyond the adjacent separator. If the active substance is coated on a surface of a part that is of the first current collector and that extends beyond the adjacent separator, in an operation process of the cell, the active substance coated on the surface of the part that is of the first current collector and that extends beyond the adjacent separator may come into contact with the adjacent second current collector because of extrusion. This results in a safety problem of a short circuit. Therefore, in an embodiment, the coating range of the active substance on the first current collector does not extend, in the second direction, beyond the separator. This means that the separator acts as a barrier to the active substance, so that the active substance on the first current collector does not come into contact with the adjacent second current collector even if extrusion occurs, thereby improving safety of the cell during operation.

In an embodiment, the first current collector, the separator, and the second current collector are stacked and rolled by using a third direction as an axis. The first current collector extends, in the third direction, beyond the separator, and the first current collector conducts, in the third direction, heat to the battery housing through contact between the first current collector and the battery housing. The battery in an embodiment is a jelly roll battery.

In an embodiment, the first current collector is coated with an active substance, and a coating range of the active substance on the first current collector does not extend, in the third direction, beyond the separator. To increase thermal conductivity of a heat transfer path from the cell to the battery housing, in an embodiment, the first current collector is, in the third direction, brought into contact with the battery housing, but the second current collector is not brought into contact with the battery housing. In this case, the first current collector extends, in the third direction, beyond the adjacent separator. If the active substance is coated on a surface of a part that is of the first current collector and that extends beyond the adjacent separator, in an operation process of the cell, the active substance coated on the surface of the part that is of the first current collector and that extends beyond the adjacent separator may come into contact with the adjacent second current collector because of extrusion. This results in a safety problem of a short circuit. Therefore, in an embodiment, the coating range of the active substance on the first current collector does not extend, in the third direction, beyond the separator. This means that the separator acts as a barrier to the active substance, so that the active substance on the first current collector does not come into contact with the adjacent second current collector even if extrusion occurs, thereby improving safety of the cell during operation.

In an embodiment, the first current collector is welded to an inner surface of the battery housing. In an embodiment of the application, that the first current collector is welded to the inner surface of the battery housing improves solution flexibility and selectivity.

In an embodiment, the battery housing includes a battery outer casing and a heat sink. The heat sink is in contact with an inner surface of the battery outer casing, and the first current collector is in contact with the heat sink.

In an embodiment, the heat sink is in contact with the inner surface of the battery outer casing, and the first current collector is fastened to the heat sink, so that a part of heat generated by the cell can be directly conducted to the battery outer casing through the first current collector and the heat sink. Because thermal conductivity of the current collector and the heat sink is quite high, the heat dissipation performance of the cell is improved.

In an embodiment, the first current collector is welded to the heat sink. In an embodiment of the application, that the first current collector is welded to the heat sink improves solution flexibility and selectivity.

An embodiment of the application provides an electrical apparatus, including an electrical load and at least one battery as described herein. The battery is electrically connected to the electrical load, and the battery is configured to supply power to the electrical load.

An embodiment of the application provides a cell installation method, including:

disposing a first current collector, a separator, and a second current collector in a stacked manner in a first direction, where the first current collector extends, in a second direction, beyond the separator, and the second direction is perpendicular to the first direction; fastening the first current collector, in the second direction, to a first battery end cover to form a first cell assembly; filling the first cell assembly into a first battery housing, where the first battery housing is a housing with two side openings; and respectively welding the first battery end cover and a second battery end cover at the two side openings of the first battery housing, so that the first cell assembly is disposed inside the first battery housing.

In an embodiment, the fastening the first current collector, in the second direction, to a first battery end cover includes:

welding the first current collector, in the second direction, to the first battery end cover.

An embodiment of the application provides the cell installation method. The method includes: disposing the first current collector, the separator, and the second current collector in a stacked manner in the first direction, where the first current collector extends, in the second direction, beyond the separator, and the second direction is perpendicular to the first direction; fastening the first current collector, in the second direction, to the first battery end cover to form the first cell assembly; filling the first cell assembly into the first battery housing, where the first battery housing is the housing with the two side openings; and respectively welding the first battery end cover and the second battery end cover at the two side openings of the first battery housing, so that the first cell assembly is disposed inside the first battery housing. In a battery fabricated by using the foregoing method, the first current collector in a cell of the battery is fastened to the first battery end cover, so that a part of heat generated by the cell can be directly conducted to the first battery end cover through the first current collector. Because thermal conductivity of the current collector is quite high, heat dissipation performance of the cell is improved.

An embodiment of the application provides a cell installation method. The method includes: disposing a first current collector, a separator, and a second current collector in a stacked manner in a first direction, where the first current collector extends, in a second direction, beyond the separator, and the second direction is perpendicular to the first direction; fastening the first current collector, in the second direction, to a heat sink to form a second cell assembly; filling the second cell assembly into a second battery housing, so that the heat sink is in contact with an inner surface of the second battery housing, where the second battery housing is a housing with one side opening; and welding a third battery end cover at the one side opening of the second battery housing, so that the second cell assembly is disposed in a closed manner inside the second battery housing.

In an embodiment, the first current collector is coated with an active substance, and a coating range of the active substance on the first current collector does not extend, in the second direction, beyond the separator.

An embodiment of the application provides the cell installation method. The method includes: disposing the first current collector, the separator, and the second current collector in a stacked manner in the first direction, where the first current collector extends, in the second direction, beyond the separator, and the second direction is perpendicular to the first direction; fastening the first current collector, in the second direction, to the heat sink to form the second cell assembly; filling the second cell assembly into the second battery housing, so that the heat sink is in contact with the inner surface of the second battery housing, where the second battery housing is the housing with the one side opening; and welding the third battery end cover at the one side opening of the second battery housing, so that the second cell assembly is disposed in a closed manner inside the second battery housing. In a battery fabricated by using the foregoing method, the first current collector in a cell of the battery is fastened to the heat sink, so that a part of heat generated by the cell can be directly conducted to the second battery housing through the first current collector and the heat sink. Because thermal conductivity of the current collector and the heat sink is quite high, heat dissipation performance of the cell is improved.

An embodiment of the application provides a cell installation method. The method includes: disposing a first current collector, a separator, and a second current collector in a stacked manner and rolling them by using a third direction as an axis, where the first current collector extends, in the third direction, beyond the separator; fastening the first current collector, in the third direction, to a first battery end cover to form a third cell assembly; filling the third cell assembly into a first battery housing, where the first battery housing is a housing with two side openings; and respectively welding the first battery end cover and a second battery end cover at the two side openings of the first battery housing, so that the third cell assembly is disposed inside the first battery housing.

An embodiment of the application provides the cell installation method. The method includes: disposing the first current collector, the separator, and the second current collector in a stacked manner and rolling them by using the third direction as the axis, where the first current collector extends, in the third direction, beyond the separator; fastening the first current collector, in the third direction, to the first battery end cover to form the third cell assembly; filling the third cell assembly into the first battery housing, where the first battery housing is the housing with the two side openings; and respectively welding the first battery end cover and the second battery end cover at the two side openings of the first battery housing, so that the third cell assembly is disposed inside the first battery housing. In a battery fabricated by using the foregoing method, the first current collector in a cell of the battery is fastened to the first battery end cover, so that a part of heat generated by the cell can be directly conducted to the first battery end cover through the first current collector. Because thermal conductivity of the current collector is quite high, heat dissipation performance of the cell is improved.

In an embodiment, the fastening the first current collector, in the third direction, to a first battery end cover includes: welding the first current collector, in the third direction, to the first battery end cover.

An embodiment of the application provides a cell installation method. The method includes: disposing a first current collector, a separator, and a second current collector in a stacked manner and rolling them by using a third direction as an axis, where the first current collector extends, in the third direction, beyond the separator; fastening the first current collector, in the third direction, to a heat sink to form a fourth cell assembly; filling the fourth cell assembly into a second battery housing, so that the heat sink is in contact with the second battery housing, where the second battery housing is a housing with one side opening; and welding a third battery end cover at the one side opening of the second battery housing, so that the fourth cell assembly is disposed in a closed manner inside the second battery housing.

In an embodiment, the first current collector is coated with an active substance, and a coating range of the active substance on the first current collector does not extend, in the third direction, beyond the separator.

An embodiment of the application provides the cell installation method. The method includes: disposing the first current collector, the separator, and the second current collector in a stacked manner and rolling them by using the third direction as the axis, where the first current collector extends, in the third direction, beyond the separator; fastening the first current collector, in the third direction, to the heat sink to form the fourth cell assembly; filling the fourth cell assembly into the second battery housing, so that the heat sink is in contact with the second battery housing, where the second battery housing is the housing with the one side opening; and welding the third battery end cover at the one side opening of the second battery housing, so that the fourth cell assembly is disposed inside the second battery housing. In a battery fabricated by using the foregoing method, the first current collector in a cell of the battery is fastened to the heat sink, so that a part of heat generated by the cell can be directly conducted to the second battery housing through the first current collector and the heat sink. Because thermal conductivity of the current collector and the heat sink is quite high, heat dissipation performance of the cell is improved.

It can be learned from the foregoing technical solutions that, the application has the following advantage:

The embodiments of the application provide the battery, including the battery housing, the first current collector, the separator, and the second current collector. The first current collector, the separator, and the second current collector are stacked and disposed inside the battery housing. The polarities of the first current collector and the second current collector are different, and the first current collector is in contact with the battery housing. The first current collector in the battery is brought into contact with the battery housing, so that a part of heat generated by the cell can be directly conducted to the battery housing through the first current collector. Because the thermal conductivity of the current collector is quite high, the heat dissipation performance of the cell is improved.

BRIEF DESCRIPTION OF DRAWINGS

FIG. 5 is a schematic structural diagram of a first current collector in a jelly roll battery according to an embodiment of the application;

FIG. 6 is a schematic diagram of an embodiment of a cell installation method according to an embodiment of the application;

DESCRIPTION OF EMBODIMENTS

Figure 1:
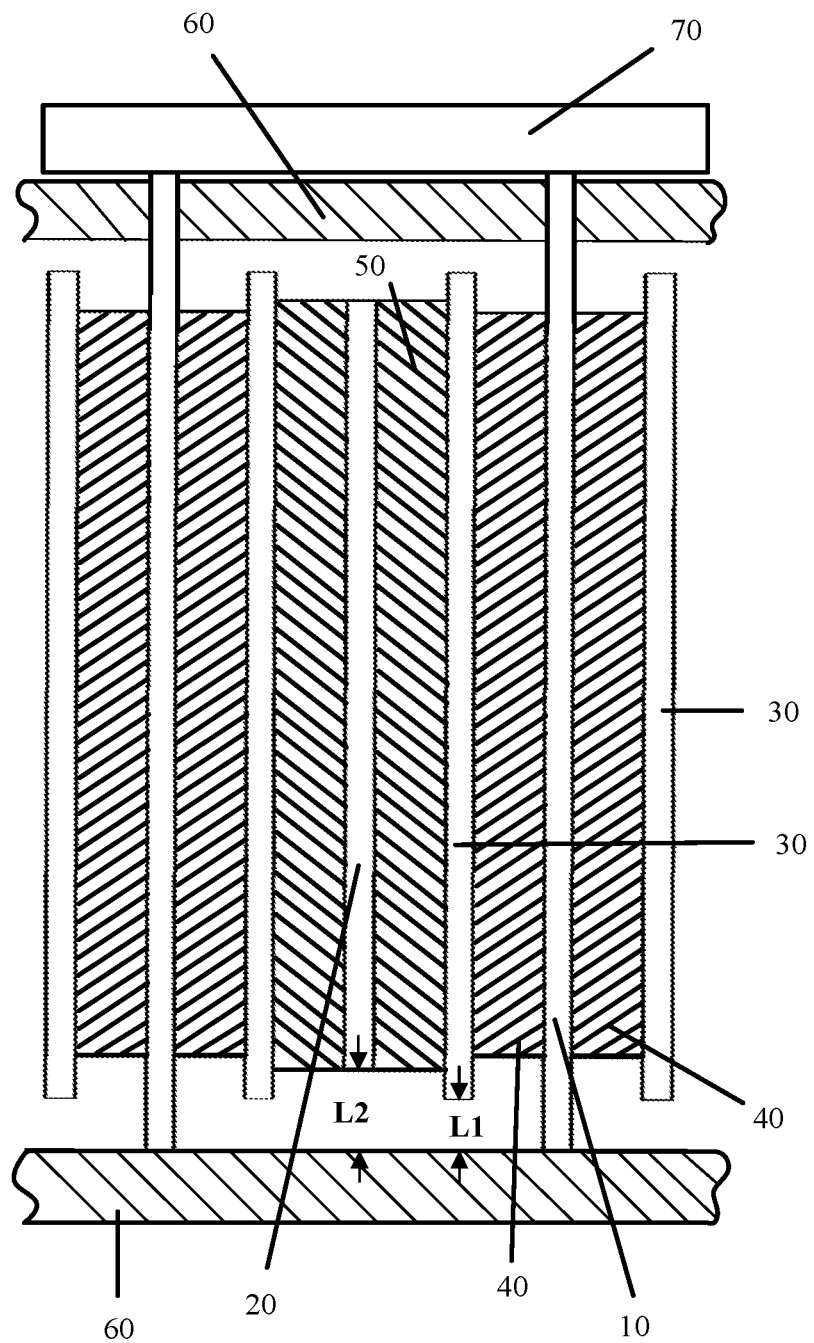
FIG. 1 is a partial side view of a stacked battery according to an embodiment of the application.

Embodiments of the application provide a battery, an electrical apparatus, and a cell installation method. A first current collector in a battery is brought into contact with a battery housing, so that a part of heat generated by a cell can be directly conducted to the battery housing through the first current collector. Because thermal conductivity of the current collector is quite high, heat dissipation performance of the cell is improved.

In the specification, claims, and accompanying drawings of the application, the terms "first", "second", "third", "fourth", and so on (if existent) are intended to distinguish between similar objects but do not necessarily indicate an order or sequence. It should be understood that the data termed in such a way are interchangeable in proper circumstances so that the embodiments of the disclosure described herein can be implemented in orders other than the order illustrated or described herein. Moreover, the terms "include", "contain" and any other variant mean to cover the non-exclusive inclusion, for example, a process, method, system, product, or device that includes a list of operations or units is not necessarily limited to those operations or units, but may include other operations or units not expressly listed or inherent to such a process, method, system, product, or device.

The following clearly describes the technical solutions in the embodiments of the disclosure with reference to the accompanying drawings in the embodiments of the disclosure. Apparently, the described embodiments are merely some rather than all of the embodiments of the disclosure. All other embodiments obtained by one of ordinary skill in the art based on the embodiments of the disclosure without creative efforts shall fall within the protection scope of the disclosure.

A cell is a core component of an electric automobile. As energy density of the cell and a speed of fast charging increase continuously, a heat dissipation problem of the cell becomes more serious. When the electric automobile is charged, electrical energy is converted into chemical energy and the chemical energy is stored in the cell. When the electric automobile travels, the chemical energy stored in the cell is converted into electric energy. In the two energy conversion processes, heat is generated inside the cell, and a higher charging or discharging speed leads to more heat generated inside the cell. Consequently, the cell heats up. The cell is a temperature sensitive component. When temperature of the cell is excessively high, a lifespan of the cell is shortened seriously, and even there is a risk of an explosion resulting from thermal runaway. Therefore, effective heat dissipation measures are used to control the temperature of the cell to be within a proper operating temperature range.

In the prior art, a positive electrode active substance is coated on a positive electrode current collector to form a positive electrode sheet, and a negative electrode active substance is coated on a negative electrode current collector to form a negative electrode sheet. A cell includes the positive electrode sheet, the negative electrode sheet, and a separator. The separator is configured to separate the positive electrode sheet from the negative electrode sheet. Generally, to prevent the positive electrode sheet from being in direct contact with the negative electrode sheet, an edge side of the separator extends beyond an edge side of the adjacent positive electrode sheet and an edge side of the adjacent negative electrode sheet. After the cell is filled into a battery housing, the edge side of the separator is in direct contact with an inner surface of the battery housing, and there is an air gap between the positive electrode current collector or negative electrode current collector and the battery housing. In this case, a heat transfer path from an inner part of the cell to the inner surface of the battery housing is from the current collector to the separator or from the current collector to the air gap. Because thermal conductivity of the separator and the air gap is quite low, heat transfer efficiency is quite low, and heat generated inside the cell cannot be quickly conducted to the battery housing.

To resolve this problem, an embodiment of the application provides a battery. A first current collector in the battery is brought into contact with a battery housing, so that a part of heat generated by a cell in the battery can be directly conducted to the battery housing through the first current collector. The following details an embodiment of the battery provided in the application.

It can be understood that, based on different fabrication processes, batteries may be classified into a battery fabricated by using a stacking process (referred to as a stacked battery below) and a battery fabricated by using a jelly-roll process (referred to as a jelly roll battery below). The descriptions of the fabrication processes are as follows.

1. Stacked Battery

FIG. 1 is a partial side view of a stacked battery according to an embodiment of the application. In a scenario in which a first current collector 10 is a rectangular sheet, as shown in FIG. 1, the battery in an embodiment includes: a battery housing 60, a first current collector 10, a separator 30, and a second current collector 20. The first current collector 10, the separator 30, and the second current collector 20 are stacked and disposed inside the battery housing 60. Polarities of the first current collector 10 and the second current collector 20 are different, and the first current collector 10 is in contact with the battery housing 60.

In an embodiment of the application, the first current collector 10, the separator 30, and the second current collector 20 are stacked in a first direction. The first current collector 10 extends, in a second direction, beyond the separator 30, and the first current collector 10 may conduct, in the second direction, heat to the battery housing 60 through contact between the first current collector 10 and the battery housing 60. The second direction is perpendicular to the first direction. In an embodiment, the first direction may be a direction perpendicular to a plane on which the first current collector 10 is located, and the second direction may be a direction parallel to the plane on which the first current collector 10 is located.

In an embodiment of the application, if the first current collector 10 is a positive electrode current collector, the second current collector 20 is correspondingly a negative electrode current collector; or if the first current collector 10 is a negative electrode current collector, the second current collector 20 is correspondingly a positive electrode current collector.

In an embodiment of the application, the battery may further include a battery post 70. In a scenario in which the first current collector 10 is a rectangular sheet, the first current collector 10 may include four ends, and one of the four ends is connected to the battery post 70. In an embodiment, an end that is of the first current collector 10 and that conducts heat to the battery housing 60 through contact between the first current collector 10 and the battery housing 60 may be any one or more ends other than the end connected to the battery post 70.

Figure 2:
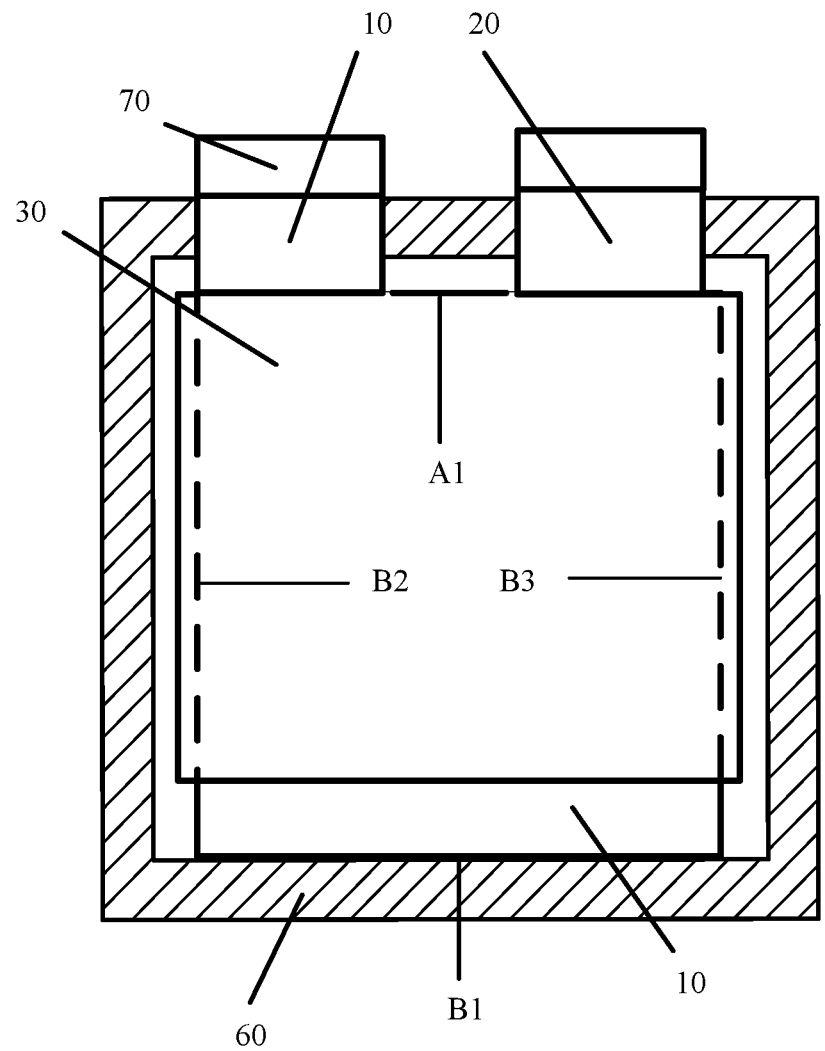
FIG. 2 is a top view of a stacked battery according to an embodiment of the application.

FIG. 2 is a top view of a stacked battery according to an embodiment of the application. An angle of view in FIG. 2 is in a direction perpendicular to the plane on which the first current collector 10 is located. As shown in FIG. 2, the separator 30 is attached to the first current collector 10. The first current collector 10 includes four ends (a first end A1, a second end B1, a second end B2, and a second end B3). In an embodiment, any one of the second end B1, the second end B2, or the second end B3 of the first current collector 10 may be brought into contact with the corresponding battery housing 60. It should be noted that, as shown in FIG. 2, the second end B1 is in contact with the battery housing 60, but the second end B2 or the second end B3 may be in contact with the battery housing 60 in actual application.

In another embodiment of the application, at least two ends of the second end B1, the second end B2, and the second end B3 of the first current collector 10 may be brought into contact with the battery housing 60. For example, the second end B1 and the second end B2 may be brought into contact with the battery housing 60, the second end B2 and the second end B3 may be brought into contact with the battery housing 60, or all of the second end B1, the second end B2, and the second end B3 may be brought into contact with the battery housing 60. This is not limited herein.

In another embodiment of the application, the second end B1, the second end B2, or the second end B3 of the first current collector 10 may be partially extended, to make the second end B1, the second end B2, or the second end B3 come into contact with the battery housing 60. It should be noted that a shape of an extension part of the second end B1 may be a rectangle, or may be any other shape. This is not limited herein.

In another embodiment of the application, one stacked battery may include a plurality of first current collectors 10. The first current collector 10 in contact with the battery housing 60 may be all of the first current collectors 10 in the stacked battery or may be some of all the first current collectors 10. In actual application, a first current collector 10 in contact with the battery housing 60 may be selected depending on a requirement. This is not limited herein.

In an embodiment of the application, the separator 30 may not be, in the second direction, in contact with the battery housing 60. As shown in FIG. 1, a first preset distance L1 is reserved, in the second direction, between the separator 30 and the battery housing 60, that is, a spacing is reserved, in the second direction, between the separator 30 and the battery housing 60.

In an embodiment, the first current collector 10 extends, in the second direction, beyond the separator 30, that is, a spacing is reserved, in the second direction, between the separator 30 and the battery housing 60, and the first current collector 10 is, in the second direction, in contact with the battery housing 60, so that heat radiated from an inner part of a cell is not conducted through the separator 30, but is directly conducted to the battery housing 60 through the first current collector 10 instead. Because thermal conductivity of the current collector is much higher than that of the separator 30, heat dissipation performance of the cell is improved.

In an embodiment of the application, as shown in FIG. 1, a second preset distance L2 may be reserved, in the second direction, between the second current collector 20 and the battery housing 60.

In an embodiment, the second preset distance L2 is reserved, in the second direction, between the second current collector 20 and the battery housing 60, that is, a spacing is reserved between the second current collector 20 and the battery housing 60. In an embodiment, when the first current collector 10 is in contact with the battery housing 60, if the second current collector 20 is in contact with the battery housing 60, the cell may be short-circuited because both the first current collector 10 and the second current collector 20 are in contact with the battery housing 60. Therefore, the second preset distance L2 is reserved, in the second direction, between the second current collector 20 and the battery housing 60, to improve safety of the cell during operation.

In an embodiment, the second preset distance L2 reserved, in the second direction, between the second current collector 20 and the battery housing 60 is greater than the first preset distance L1 reserved, in the second direction, between the separator 30 and the battery housing 60.

If the first current collector 10 is in contact with the battery housing 60 and the separator 30 is not in direct contact with the battery housing 60, the first current collector 10 extends, in the second direction, beyond the adjacent separator 30. In a cell installation process, if the first current collector 10 is detached from the battery housing 60, a part that is of the first current collector 10 and that extends beyond the separator 30 may be bent and then come into contact with the second current collector 20. Consequently, the cell is short-circuited. In an embodiment, the distance, in the second direction, from the separator 30 to the battery housing 60 is set to be less than the distance from the second current collector 20 to the battery housing 60. Therefore, the separator 30 may act as a barrier between the first current collector 10 and the second current collector 20.

Even if the first current collector 10 is detached from the battery housing 60 in the cell installation process, due to a barrier function of the separator 30, a possibility that the part that is of the first current collector 10 and that extends beyond the separator 30 is bent and then comes into contact with the second current collector 20 is reduced, thereby improving safety of the cell during operation.

In an embodiment of the application, as shown in FIG. 1, the first current collector 10 is coated with an active substance 40, and a coating range of the active substance 40 on the first current collector 10 does not extend, in the second direction, beyond the separator 30. It should be noted that the second current collector 20 is coated with an active substance 50, and a coating range of the active substance 50 on the second current collector 20 does not extend, in the second direction, beyond the separator 30 either.

To increase thermal conductivity of a heat transfer path from the cell to the battery housing, in an embodiment, the first current collector 10 is, in the second direction, brought into contact with the battery housing 60, but the second current collector 20 is not brought into contact with the battery housing 60. In this case, the first current collector 10 extends, in the second direction, beyond the adjacent separator 30. If the active substance 40 is coated on a surface of a part that is of the first current collector 10 and that extends beyond the adjacent separator 30, in an operation process of the cell, the active substance 40 coated on the surface of the part that is of the first current collector 10 and that extends beyond the adjacent separator 30 may come into contact with the adjacent second current collector 20 because of extrusion. This results in a safety problem of a short circuit. Therefore, in an embodiment, the coating range of the active substance 40 on the first current collector 10 does not extend, in the second direction, beyond the separator 30.

This means that the separator 30 acts as a barrier to the active substance 40, so that the active substance on the first current collector 10 does not come into contact with the adjacent second current collector 20 even if extrusion occurs, thereby improving safety of the cell during operation.

In an embodiment of the application, the first current collector 10 is welded to an inner surface of the battery housing 60.

In an embodiment, a manner of contact between the first current collector 10 and the battery housing 60 is further described. In an embodiment of welding the first current collector 10 to the battery housing 60, in the cell installation process, one end of the first current collector 10 may be first welded to one battery end cover, and then a component obtained through welding may be filled into the battery housing with two side openings; and the battery end cover may be welded at one side opening of the battery housing, and then the other battery end cover may be welded at the other side opening of the battery housing, to form a closed cavity.

In an embodiment of the application, that the first current collector 10 is welded to the inner surface of the battery housing 60 improves solution flexibility and selectivity.

2. Jelly Roll Battery

Figure 3:
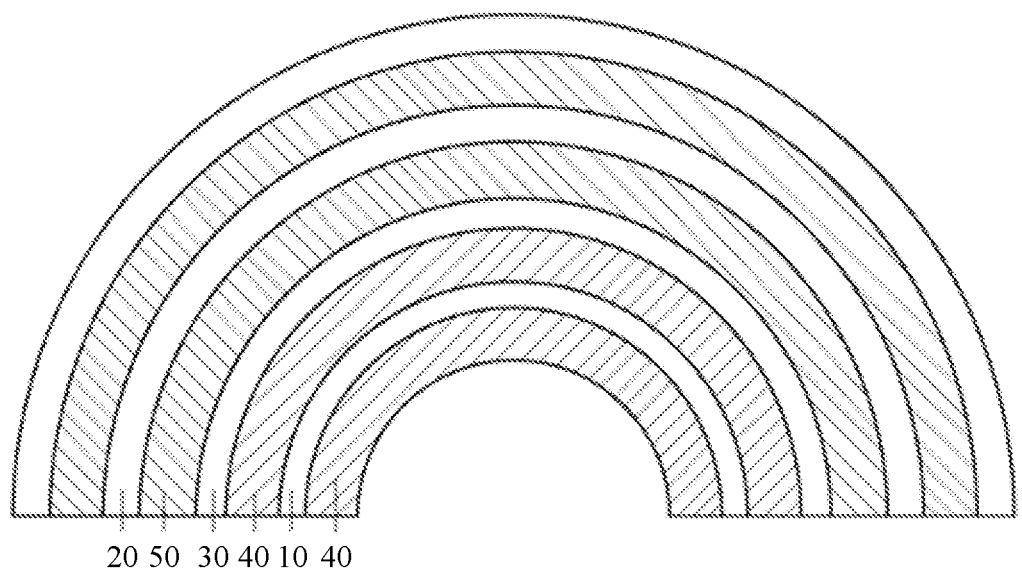
FIG. 3 is a partial side view of a jelly roll battery according to an embodiment of the application.

The foregoing describes one embodiment of the battery that is fabricated by using the stacking process and that is provided in the application, and the following details one embodiment of the battery fabricated by using the jelly-roll process. FIG. 3 is a partial side view of a jelly roll battery according to an embodiment of the application. It can be understood that, in the battery fabricated by using the stacking process, the first current collector, the second current collector, and the separator are sequentially disposed in a stacked manner in a form of a flat plate; in contrast, a separator 30, a first current collector 10, and a second current collector 20 used in the jelly-roll process may be rectangular long sheets that are not die-cut into several rectangular sheets, and the first current collector 10, the separator 30, and the second current collector 20 are rolled after being sequentially disposed in a stacked manner, where the first current collector 10 is coated with an active substance 40, and the second current collector is coated with an active substance 50.

In an embodiment, the first current collector 10, the separator 30, and the second current collector 20 are stacked and rolled by using a third direction as an axis. The first current collector 10 extends, in the third direction, beyond the separator 30, and the first current collector 10 conducts, in the third direction, heat to the battery housing 60 through contact between the first current collector 10 and the battery housing 60.

Figure 4:
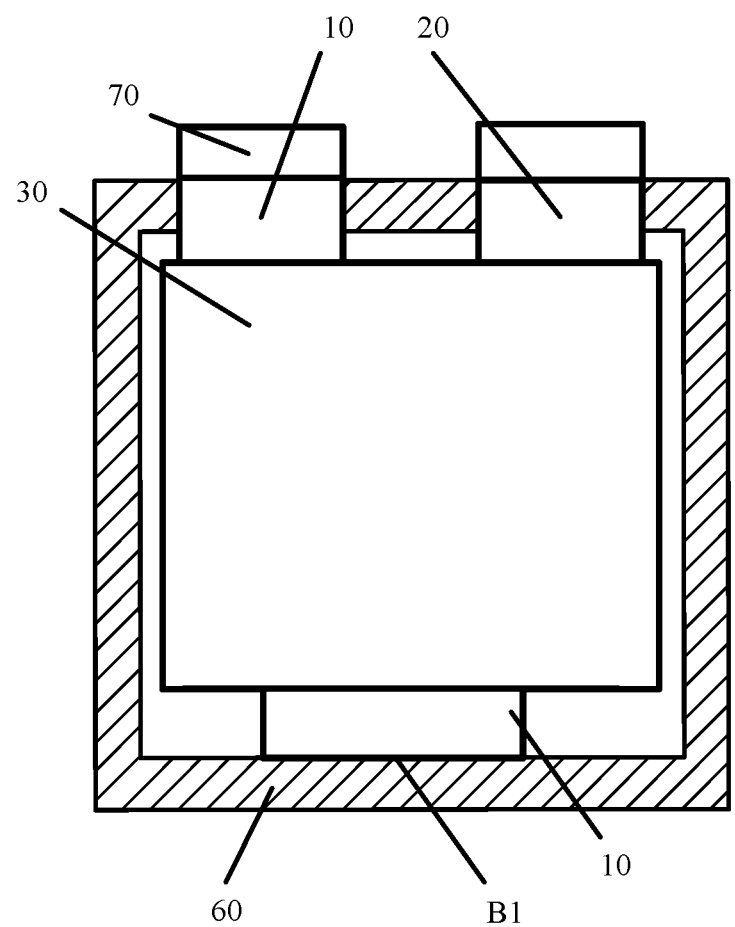
FIG. 4 is a top view of a jelly roll battery according to an embodiment of the application.

FIG. 4 is a top view of a jelly roll battery according to an embodiment of the application. A vertical downward direction in FIG. 4 is the third direction. As shown in FIG. 4, the first current collector 10 extends, in the third direction (a second end B1), beyond the separator 30, and specifically, the first current collector 10 extends beyond the separator 30 on the second end B1.

FIG. 5 is a schematic structural diagram of a first current collector in a jelly roll battery according to an embodiment of the application. As shown in FIG. 5, the first current collector is a rectangular long sheet that has not been rolled. The first current collector 10 is coated with the active substance 40, and a region in which no active substance 40 is coated is reserved on the second end B1 of the first current collector 10, so that a coating range of the active substance 40 on the rolled first current collector 10 does not extend, in the third direction (the second end B1), beyond the separator 30.

It should be noted that the battery structures shown in FIG. 1 to FIG. 4 are merely used as examples. In actual application, quantities of first current collectors, second current collectors, and separators may be determined depending on an actual requirement.

It should be noted that, although not shown in FIG. 1 to FIG. 4, the battery may further be filled with an electrolyte between the current collector and the separator actually.

It should be noted that materials of the first current collector 10, the second current collector 20, and the separator 30 in the application are not limited. A positive electrode current collector made of aluminum, nickel, copper, or an alloy containing at least one of the foregoing elements is coated with a positive electrode active substance known in the art (for example, lithium manganese oxide, lithium cobalt oxide, lithium nickel oxide, lithium iron phosphate, or a compound or a mixture containing at least one of the foregoing elements). In addition, a negative electrode current collector made of copper, nickel, aluminum, or an alloy containing at least one of the foregoing elements is coated with a negative electrode active substance known in the art (for example, lithium metal, a lithium alloy, carbon, petroleum coke, activated carbon, graphite, a silicon compound, a tin compound, a titanium compound, or an alloy containing at least one of the foregoing elements). Moreover, the separator 30 may be a multilayer film that is of a fine pore structure and is made of polyethylene, polypropylene, or a combination thereof; or may be a polymer film that is used for a solid polymer electrolyte or a gel polymer electrolyte and that is made of polyvinylidene fluoride, polyethylene oxide, polyacrylonitrile, polyvinyl fluoride-hexafluoropropylene copolymer.

Furthermore, an embodiment of the application provides a battery, including a battery housing 60, a first current collector 10, a separator 30, and a second current collector 20. The first current collector 10, the separator 30, and the second current collector 20 are stacked and disposed inside the battery housing 60. Polarities of the first current collector 10 and the second current collector 20 are different, and the first current collector 10 is in contact with the battery housing 60. The first current collector 10 in the battery is brought into contact with the battery housing 60, so that a part of heat generated by a cell can be directly conducted to the battery housing 60 through the first current collector 10. Because thermal conductivity of the current collector is quite high, heat dissipation performance of the cell is improved.

Based on the foregoing embodiments, the application further provides an electrical apparatus. The electrical apparatus includes at least one battery described in the foregoing embodiments and an electrical load. The battery is configured to supply power to the electrical load. Specifically, the electrical apparatus may be a mobile phone, a portable computer, a smartphone, a smart tablet, a netbook, a light electric vehicle, an electric vehicle, a hybrid electric vehicle, or a plug-in hybrid electric vehicle, or may be an electrical storage device or another type of electrical device. This is not limited herein.

The structure of the stacked battery is detailed in the embodiment shown in FIG. 1 and FIG. 2. With reference to the embodiment shown in FIG. 1 and FIG. 2, the following details a method for installing the cell in the stacked battery. FIG. 6 is a schematic diagram of an embodiment of a cell installation method according to an embodiment of the application. As shown in FIG. 6, the cell installation method includes the following operations.

601. Dispose the first current collector 10, the separator 30, and the second current collector 20 in a stacked manner in the first direction, where the first current collector 10 extends, in the second direction, beyond the separator 30, and the second direction is perpendicular to the first direction.

In an embodiment, in a fabrication process of the cell, the active substance 40 may first be coated on the first current collector 10, and then the active substance 50 may be coated on the second current collector 20. Refer to FIG. 2. It should be noted that the active substance 40 may not be coated in an edge region on one side (for example, the second end B1) that is of the first current collector 10 and that is connected to the battery post 70.

In an embodiment, the first current collector 10 coated with the active substance 40, the separator 30, and the second current collector 20 coated with the active substance 50 need to be disposed in a form of a flat plate in a stacked manner in the first direction to form the cell, and relative locations between the first current collector 10, the separator 30, and the second current collector 20 need to be controlled, to make the first current collector 10 extend, in the second direction, beyond the separator 30. The second direction is perpendicular to the first direction.

It should be noted that, quantities of first current collectors 10, separators 30, and second current collectors 20 are not limited in an embodiment.

602. Fasten the first current collector 10, in the second direction, to a first battery end cover 80 to form a first cell assembly.

Figure 7A:
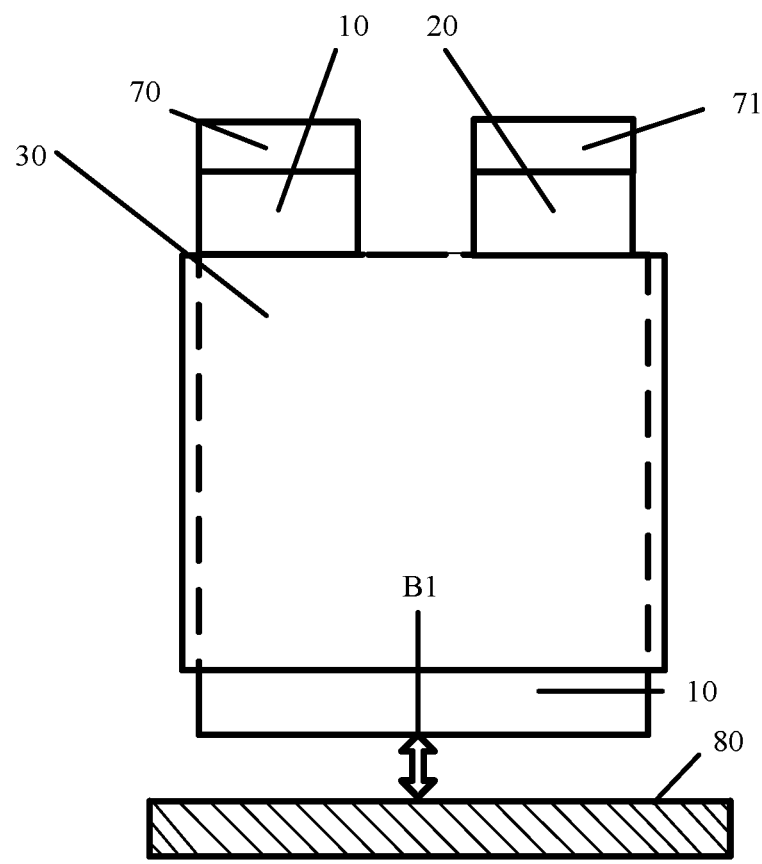
FIG. 7a is a schematic diagram of a cell installation process according to an embodiment of the application.

FIG. 7a is a schematic diagram of a cell installation process according to an embodiment of the application. As shown in FIG. 7a, the first current collector 10 extends, in the second direction, beyond the separator 30 (the second end B1). The second end B1 is fastened to the first battery end cover 80 to form the first cell assembly. It should be noted that one side of the first current collector 10 other than the second end B1 may further be connected to a battery post 70, and correspondingly, the second current collector 20 may further be connected to a battery post 71. The first cell assembly in an embodiment may include the first battery end cover 80, the battery post 70, the battery post 71, and the cell that is formed by sequentially disposing the first current collector 10, the separator 30, and the second current collector 20 in a stacked manner.

In an embodiment, the first current collector 10 may be welded, in the second direction, to the first battery end cover 80, or the first current collector 10 may be bonded, in the second direction, to the first battery end cover 80.

603. Fill the first cell assembly into a first battery housing 81, where the first battery housing 81 is a housing with two side openings.

604. Respectively weld the first battery end cover 80 and a second battery end cover 82 at the two side openings of the first battery housing 81, so that the first cell assembly is disposed in a closed manner inside the first battery housing 81.

Figure 7B:
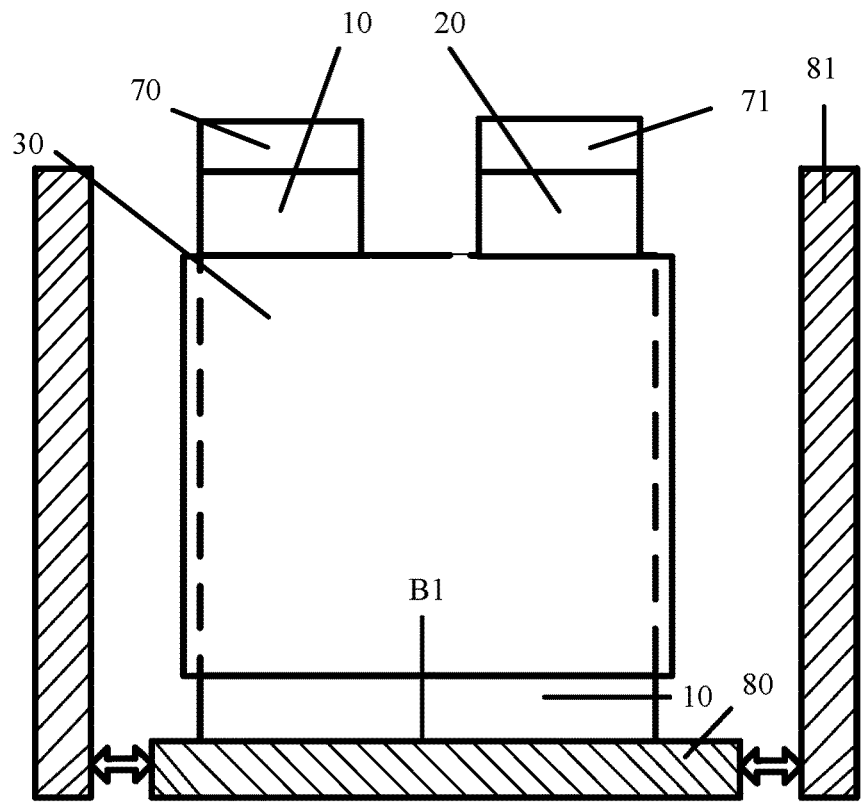
FIG. 7b is a schematic diagram of a cell installation process according to an embodiment of the application.

FIG. 7b is a schematic diagram of a cell installation process according to an embodiment of the application. As shown in FIG. 7b, after fabrication of the first cell assembly is completed, the first cell assembly needs to be assembled into the first battery housing 81.

In an embodiment, two sides of the openings of the first battery housing 81 may be two opposite sides of the housing, for example, may be any two opposite sides of a cuboid. Shapes of the first battery end cover 80 and the second battery end cover 82 may respectively coincide with shapes of the two openings of the first battery housing 81. After the first cell assembly is filled into the first battery housing 81, the first battery end cover 80 may be welded at one opening of the first battery housing 81.

Figure 7C:
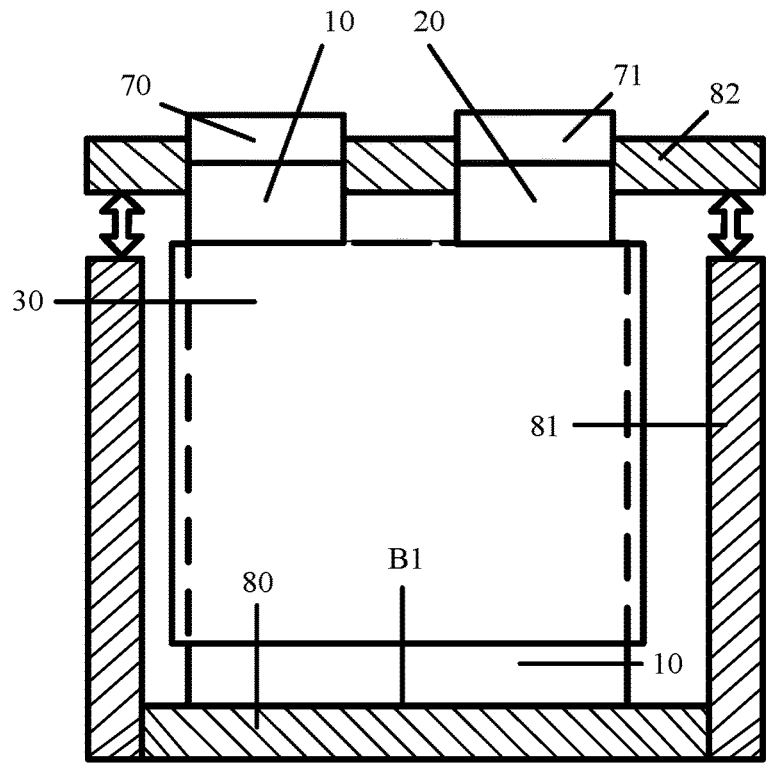
FIG. 7c is a schematic diagram of a cell installation process according to an embodiment of the application.

FIG. 7c is a schematic diagram of a cell installation process according to an embodiment of the application. As shown in FIG. 7c, after the first battery end cover 80 is welded to one opening of the first battery housing 81, the second battery end cover 82 may be welded at the other opening of the first battery housing 81, to form a closed cavity. In this way, the first cell assembly is disposed in a closed manner inside the first battery housing 81.

It should be noted that, if the first battery housing 81 with one side opening is used to accommodate the cell, inner surfaces of the first battery housing 81 cannot be strictly perpendicular to each other because of technique limitations. Therefore, one side that is of the first current collector 10 and that extends beyond the separator cannot be welded to an inner surface of the first battery housing 81. If the first battery housing 81 with two side openings is used to accommodate the cell, one side that is of the first current collector 10 and that extends beyond the separator may be first welded to the first battery end cover 80, and then the first battery end cover 80 may be welded to one side opening of the first battery housing 81.

It can be understood that, in actual application, liquid injection, formation, degassing, liquid injection hole welding, cleaning, and other processing further need to be performed on the assembled battery.

An embodiment of the application provides the cell installation method. The method includes: disposing the first current collector 10, the separator 30, and the second current collector 20 in a stacked manner in the first direction, where the first current collector 10 extends, in the second direction, beyond the separator 30, and the second direction is perpendicular to the first direction; fastening the first current collector 10, in the second direction, to the first battery end cover 80 to form the first cell assembly; filling the first cell assembly into the first battery housing 81, where the first battery housing 81 is the housing with the two side openings; and respectively welding the first battery end cover 80 and the second battery end cover 82 at the two side openings of the first battery housing 81, so that the first cell assembly is disposed inside the first battery housing 81. In the battery fabricated by using the foregoing method, the first current collector 10 in the cell of the battery is fastened to the first battery end cover 80, so that a part of heat generated by the cell can be directly conducted to the first battery end cover 80 through the first current collector 10. Because thermal conductivity of the current collector is quite high, heat dissipation performance of the cell is improved.

Figure 8:
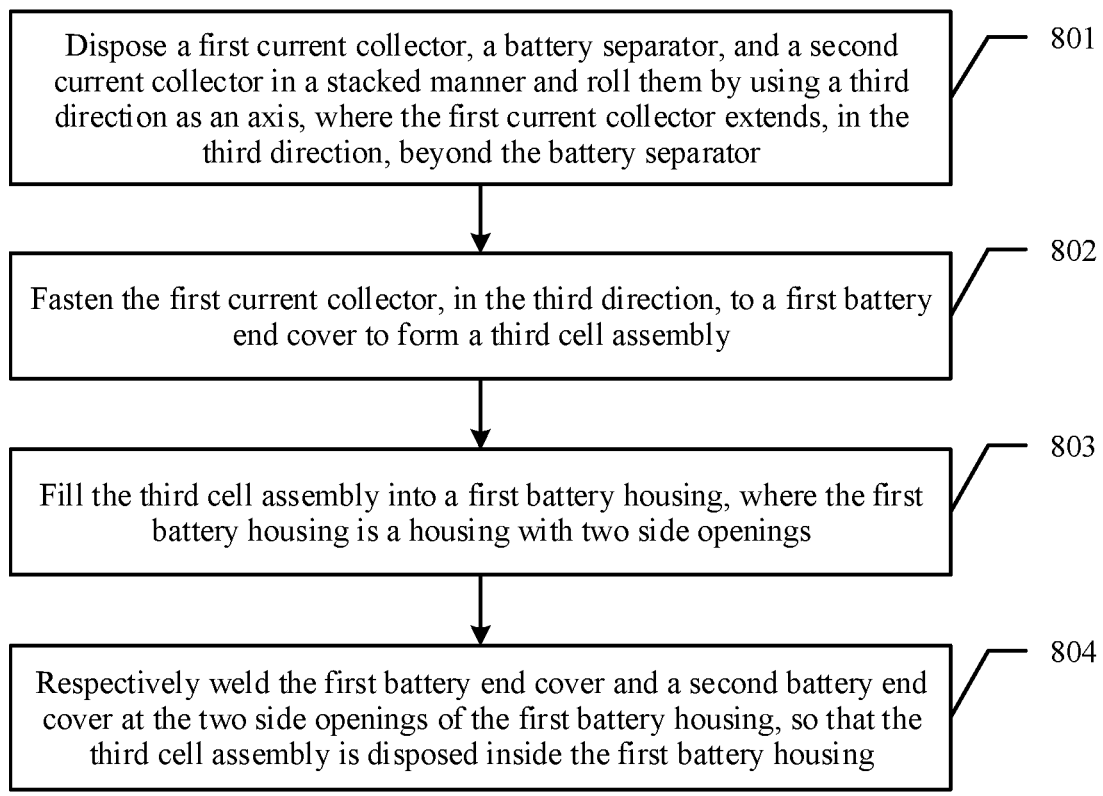
FIG. 8 is a schematic diagram of an embodiment of a cell installation method according to an embodiment of the application.

The structure of the jelly roll battery is detailed in the embodiment shown in FIG. 3 to FIG. 5. With reference to the embodiment shown in FIG. 3 to FIG. 5, the following details a method for installing the cell in the jelly roll battery. FIG. 8 is a schematic diagram of an embodiment of a cell installation method according to an embodiment of the application. As shown in FIG. 8, the cell installation method includes the following operations.

801. Dispose the first current collector 10, the separator 30, and the second current collector 20 in a stacked manner and roll them by using the third direction as the axis, where the first current collector 10 extends, in the third direction, beyond the separator 30.

Refer to FIG. 3. It should be noted that, different from operation 601 in the embodiment corresponding to FIG. 6, in an embodiment, in a scenario in which the battery is a jelly roll battery, the first current collector 10 coated with the active substance 40, the separator 30, and the second current collector 20 coated with the active substance 50 need to be disposed in a stacked manner and need to be rolled by using the third direction as the axis, to form the cell. The third direction is a viewing direction in FIG. 3. Refer to FIG. 4. The first current collector extends, in the third direction (the second end B1), beyond the separator.

802. Fasten the first current collector 10, in the third direction, to a first battery end cover 80 to form a third cell assembly.

For a description of operation 802, refer to operation 602 in the embodiment corresponding to FIG. 6. Details are not described herein again.

803. Fill the third cell assembly into a first battery housing 81, where the first battery housing 81 is a housing with two side openings.

For a description of operation 803, refer to operation 603 in the embodiment corresponding to FIG. 6. Details are not described herein again.

804. Respectively weld the first battery end cover 80 and a second battery end cover 82 at the two side openings of the first battery housing 81, so that the third cell assembly is disposed in a closed manner inside the first battery housing 81.

For a description of operation 804, refer to operation 604 in the embodiment corresponding to FIG. 6. Details are not described herein again.

An embodiment of the application provides the cell installation method. The method includes: disposing the first current collector 10, the separator 30, and the second current collector 20 in a stacked manner and rolling them by using the third direction as the axis, where the first current collector 10 extends, in the third direction, beyond the separator 30; fastening the first current collector 10, in the third direction, to the first battery end cover 80 to form the third cell assembly; filling the third cell assembly into the first battery housing 81, where the first battery housing 81 is the housing with the two side openings; and respectively welding the first battery end cover 80 and the second battery end cover 82 at the two side openings of the first battery housing 81, so that the third cell assembly is disposed inside the first battery housing 81. In the battery fabricated by using the foregoing method, the first current collector 10 in the cell of the battery is fastened to the first battery end cover 80, so that a part of heat generated by the cell can be directly conducted to the first battery end cover 80 through the first current collector 10. Because thermal conductivity of the current collector is quite high, heat dissipation performance of the cell is improved.

Figure 9:
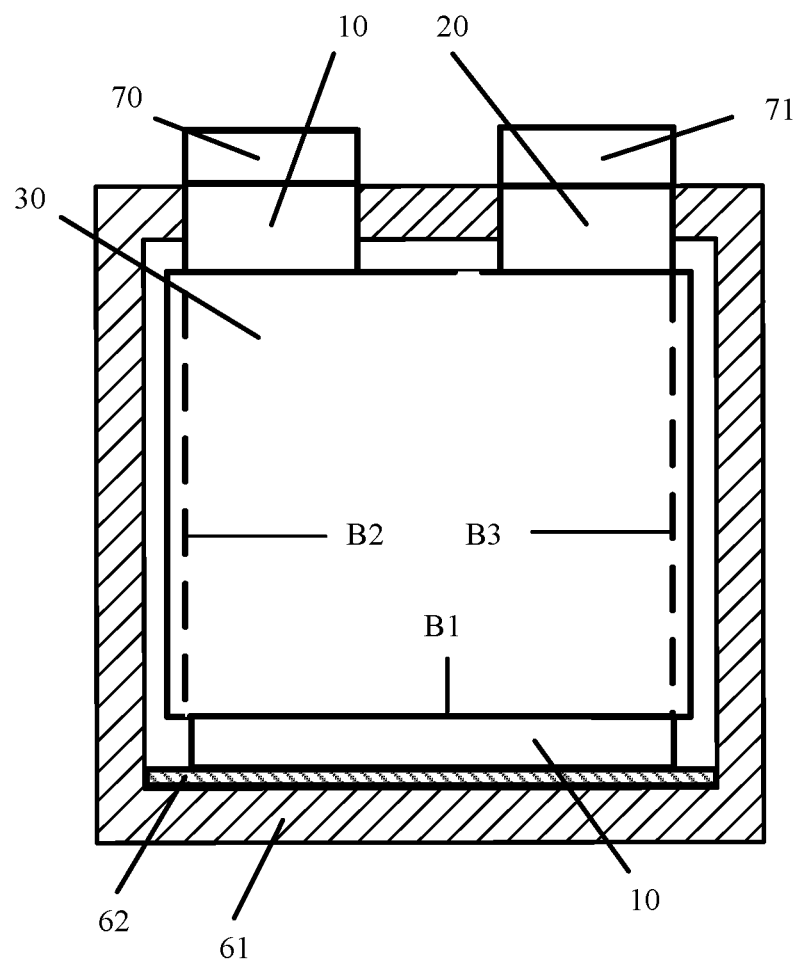
FIG. 9 is a partial side view of a battery according to an embodiment of the application.

In an embodiment, based on the embodiments described in FIG. 1 to FIG. 5, in an embodiment of the battery provided in the embodiments of the application, refer to FIG. 9. FIG. 9 is a partial side view of a battery according to an embodiment of the application. The battery housing 60 includes: a battery outer casing 61 and a heat sink 62. The heat sink 62 is in contact with an inner surface of the battery outer casing 61, and the first current collector 10 is in contact with the heat sink 62.

In an embodiment, the heat sink 62 is a metal sheet with relatively high thermal conductivity.

In an embodiment, the heat sink 62 is in contact with the inner surface of the battery outer casing 61, and the first current collector 10 is fastened to the heat sink 62, so that a part of heat generated by the cell can be directly conducted to the battery outer casing 61 through the first current collector 10 and the heat sink 62. Because thermal conductivity of the current collector and the heat sink 62 is quite high, heat dissipation performance of the cell is improved.

Figure 10:
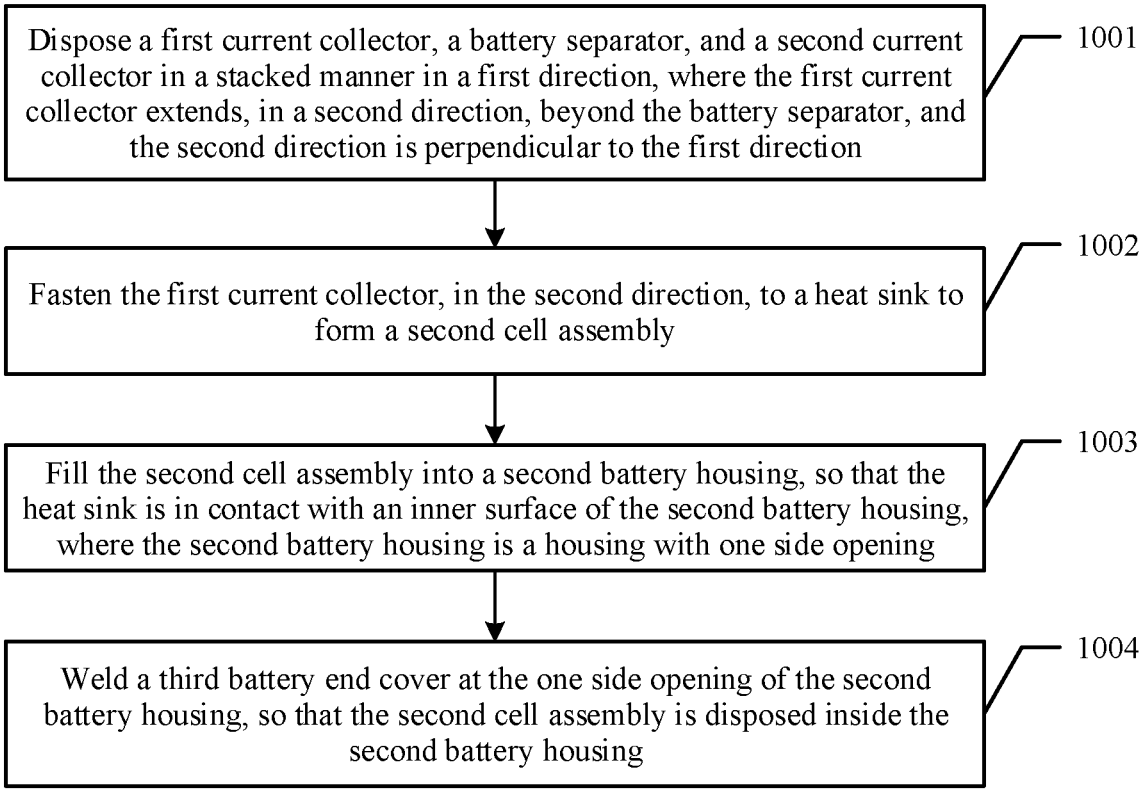
FIG. 10 is a schematic diagram of an embodiment of a cell installation method according to an embodiment of the application.

The structure of the battery is detailed in the embodiment shown in FIG. 9. With reference to the embodiment shown in FIG. 9, the following details a method for installing the cell in the battery. The method for installing the cell in the stacked battery is first described. FIG. 10 is a schematic diagram of an embodiment of a cell installation method according to an embodiment of the application. As shown in FIG. 10, the cell installation method includes the following operations.

1001. Dispose the first current collector 10, the separator 30, and the second current collector 20 in a stacked manner in the first direction, where the first current collector 10 extends, in the second direction, beyond the separator 30, and the second direction is perpendicular to the first direction.

For a description of operation 1001, refer to operation 601 in the embodiment corresponding to FIG. 6. Details are not described herein again.

1002. Fasten the first current collector 10, in the second direction, to the heat sink 62 to form a second cell assembly.

Figure 11A:
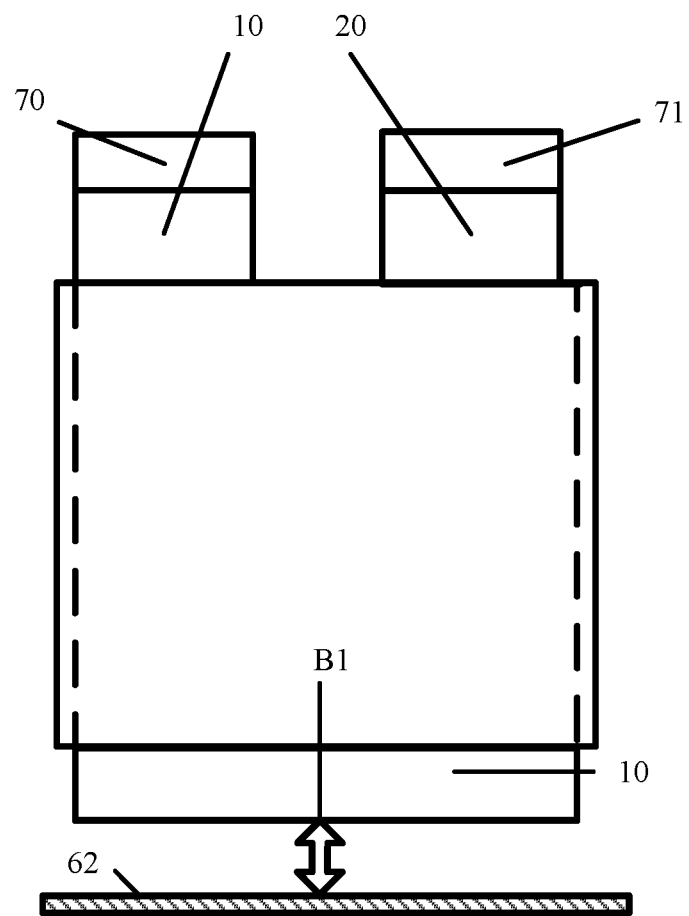
FIG. 11a is a schematic diagram of a cell installation process according to an embodiment of the application.

FIG. 11a is a schematic diagram of a cell installation method according to an embodiment of the application. As shown in FIG. 11a, after the first current collector 10, the separator 30, and the second current collector 20 are disposed in a stacked manner in the first direction to form the cell, the first current collector 10 needs to be fastened, in the second direction, to the heat sink 62 to form the second cell assembly.

Different from operation 602 in the embodiment corresponding to FIG. 6, in an embodiment, the first current collector is not fastened, in the second direction, to the first battery end cover 80, but is fastened, in the second direction, to the heat sink 62 instead to form the second cell assembly.

In an embodiment, the first current collector is welded, in the second direction, to the heat sink.

1003. Fill the second cell assembly into a second battery housing 83, so that the heat sink 62 is in contact with an inner surface of the second battery housing 83, where the second battery housing 83 is a housing with one side opening.

Figure 11B:
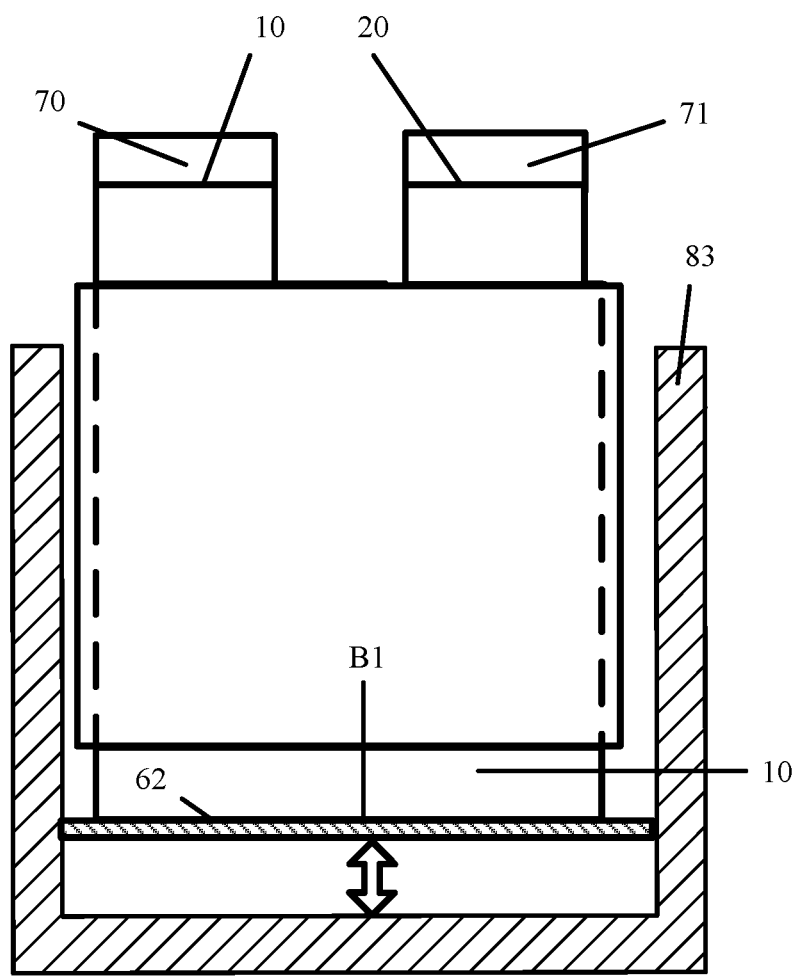
FIG. 11b is a schematic diagram of a cell installation process according to an embodiment of the application.

FIG. 11b is a schematic diagram of a cell installation method according to an embodiment of the application. As shown in FIG. 11b, after the first current collector 10 is fastened, in the second direction, to the heat sink 62 to form the second cell assembly, the second cell assembly needs to be filled into the second battery housing 83, so that the heat sink 62 is in contact with the inner surface of the second battery housing 83.

1004. Weld a third battery end cover 84 at the one side opening of the second battery housing 83, so that the second cell assembly is disposed in a closed manner inside the second battery housing 83.

Figure 11C:
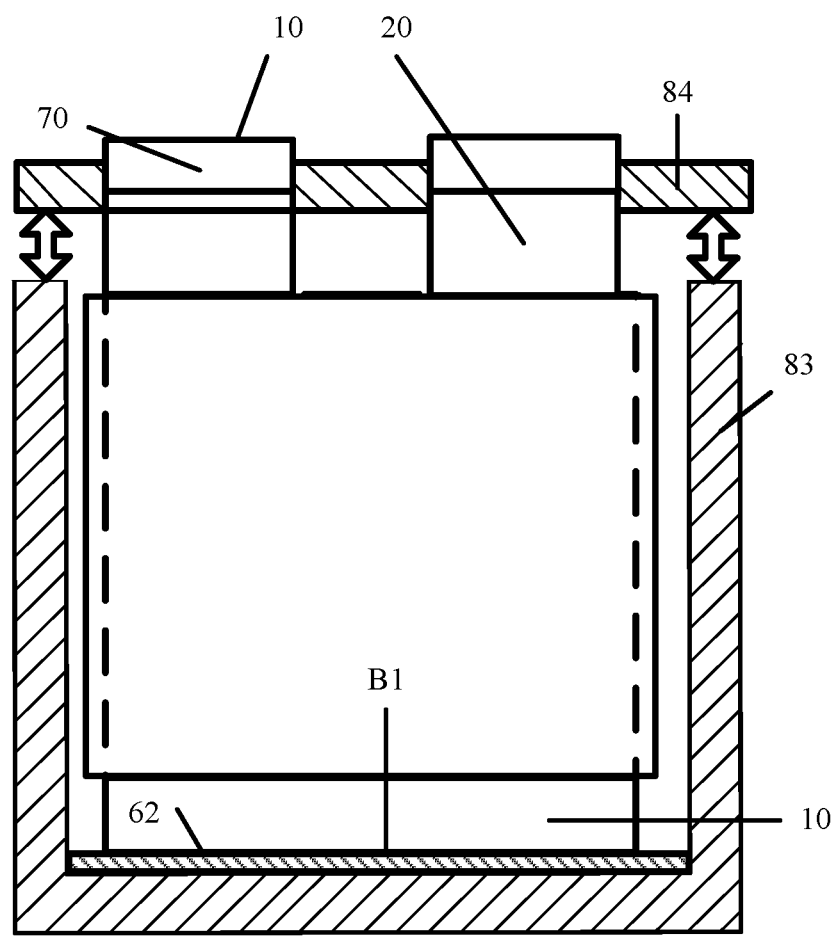
FIG. 11c is a schematic diagram of a cell installation process according to an embodiment of the application.

FIG. 11c is a schematic diagram of a cell installation method according to an embodiment of the application. As shown in FIG. 11c, after the second cell assembly is filled into the second battery housing, the third battery end cover 84 needs to be welded at the one side opening of the second battery housing 83.

It should be noted that, different from the embodiment corresponding to FIG. 6, the first current collector 10 is welded to the heat sink 62 without a need to weld the first current collector 10 to the inner surface of the first battery housing 81, and the heat sink 62 is brought into contact with the inner surface of the second battery housing 83. Therefore, in an embodiment, the second battery housing 83 with the one side opening may be used to accommodate the cell. Compared with the embodiment corresponding to FIG. 6, an operation of welding the first battery end cover 80 to one side opening of the first battery housing 81 is omitted.

It can be understood that, in actual application, liquid injection, formation, degassing, liquid injection hole welding, cleaning, and other processing further need to be performed on the assembled battery.

An embodiment of the application provides the cell installation method. The method includes: disposing the first current collector 10, the separator 30, and the second current collector 20 in a stacked manner in the first direction, where the first current collector 10 extends, in the second direction, beyond the separator 30, and the second direction is perpendicular to the first direction; fastening the first current collector 10, in the second direction, to the heat sink 62 to form the second cell assembly; filling the second cell assembly into the second battery housing 83, so that the heat sink 62 is in contact with the inner surface of the second battery housing 83, where the second battery housing 83 is the housing with the one side opening; and welding the third battery end cover 84 at the one side opening of the second battery housing 83, so that the second cell assembly is disposed in a closed manner inside the second battery housing 83. In the battery fabricated by using the foregoing method, the first current collector 10 in the cell of the battery is fastened to the heat sink 62, so that a part of heat generated by the cell can be directly conducted to the second battery housing 83 through the first current collector 10 and the heat sink 62. Because thermal conductivity of the current collector and the heat sink 62 is quite high, heat dissipation performance of the cell is improved.

Figure 12:
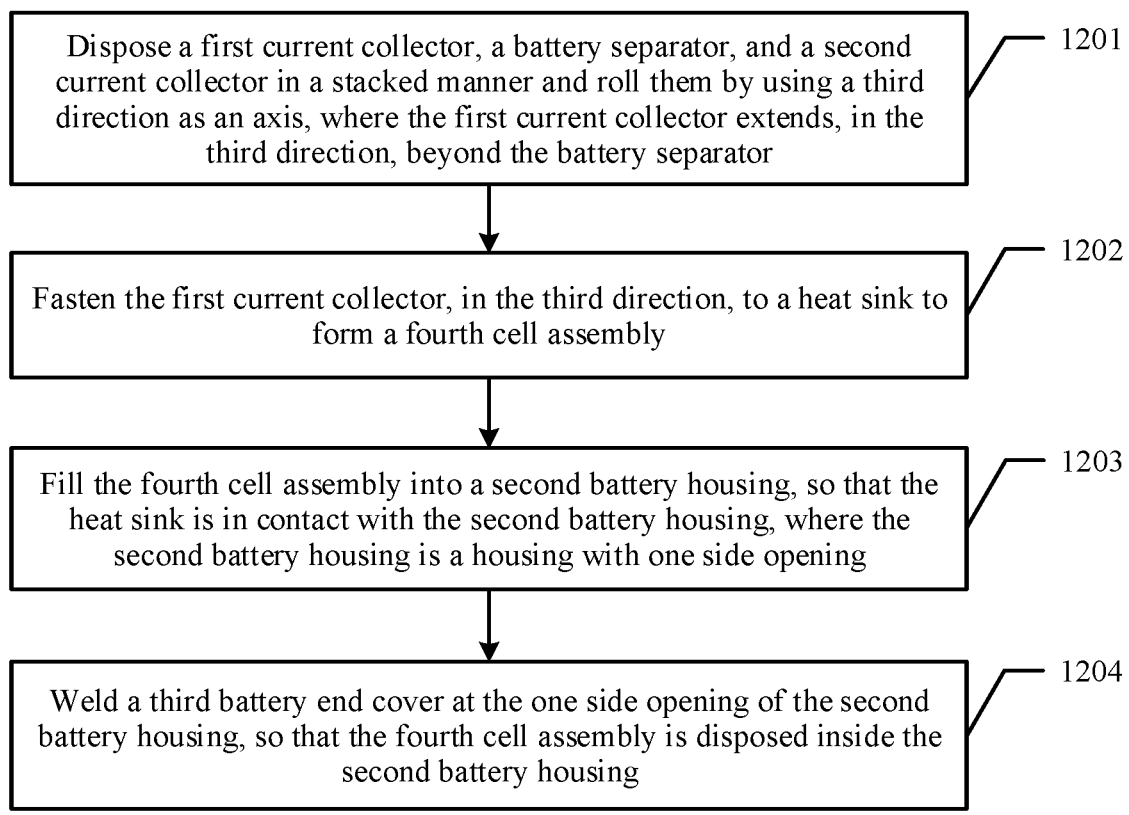
FIG. 12 is a schematic diagram of an embodiment of a cell installation method according to an embodiment of the application.

The following describes the method for installing the cell in the jelly roll battery. FIG. 12 is a schematic diagram of an embodiment of a cell installation method according to an embodiment of the application. As shown in FIG. 12, the cell installation method includes the following operations.

1201. Dispose the first current collector 10, the separator 30, and the second current collector 20 in a stacked manner and roll them by using the third direction as the axis, where the first current collector extends, in the third direction, beyond the separator.

Refer to FIG. 3. It should be noted that, different from operation 1001 in the embodiment corresponding to FIG. 10, in an embodiment, in a scenario in which the battery is a jelly roll battery, the first current collector 10 coated with the active substance 40, the separator 30, and the second current collector 20 coated with the active substance 50 need to be disposed in a stacked manner and need to be rolled by using the third direction as the axis, to form the cell. The third direction is the viewing direction in FIG. 3. Refer to FIG. 4. The first current collector extends, in the third direction (the second end B1), beyond the separator.

1202. Fasten the first current collector 10, in the third direction, to the heat sink 62 to form a fourth cell assembly.

For a description of operation 1202, refer to operation 1002 in the embodiment corresponding to FIG. 10. Details are not described herein again.

1203. Fill the fourth cell assembly into a second battery housing 83, so that the heat sink 62 is in contact with the second battery housing 83, where the second battery housing 83 is a housing with one side opening.

For a description of operation 1203, refer to operation 1003 in the embodiment corresponding to FIG. 10. Details are not described herein again.

1204. Weld a third battery end cover 84 at the one side opening of the second battery housing 83, so that the fourth cell assembly is disposed inside the second battery housing 83.

For a description of operation 1204, refer to operation 1004 in the embodiment corresponding to FIG. 10. Details are not described herein again.

An embodiment of the application provides the cell installation method. The method includes: disposing the first current collector 10, the separator 30, and the second current collector 20 in a stacked manner and rolling them by using the third direction as the axis, where the first current collector extends, in the third direction, beyond the separator; fastening the first current collector 10, in the third direction, to the heat sink 62 to form the fourth cell assembly; filling the fourth cell assembly into the second battery housing 83, so that the heat sink 62 is in contact with the second battery housing 83, where the second battery housing 83 is the housing with the one side opening; and welding the third battery end cover 84 at the one side opening of the second battery housing 83, so that the fourth cell assembly is disposed inside the second battery housing 83. In the battery fabricated by using the foregoing method, the first current collector 10 in the cell of the battery is fastened to the heat sink 62, so that a part of heat generated by the cell can be directly conducted to the second battery housing 83 through the first current collector 10 and the heat sink 62. Because thermal conductivity of the current collector and the heat sink 62 is quite high, heat dissipation performance of the cell is improved.

It may be clearly understood by one of ordinary skill in the art that, for the purpose of convenient and brief description, for a detailed working process of the foregoing system, apparatus, and unit, reference may be made to a corresponding process in the foregoing method embodiments, and details are not described herein again.

In embodiments provided in the application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings, direct couplings, or communication connections may be indirect couplings or communication connections implemented through some interfaces, apparatuses, or units, or may be implemented in electronic, mechanical, or other forms.

The foregoing embodiments are merely intended for describing the technical solutions of the application, but not for limiting the application. Although the application is described in detail with reference to the foregoing embodiments, a person of ordinary skill in the art should understand that modifications may still be made to the technical solutions described in the foregoing embodiments or equivalent replacements may be made to some technical features thereof, without departing from the spirit and scope of the technical solutions of the embodiments of the application.

What is claimed is:

1. A battery, comprising:
a battery housing;
a first current collector;
a separator; and
a second current collector; wherein the first current collector, the separator, and the second current collector are stacked and disposed inside the battery housing, wherein polarities of the first current collector and the second current collector are different, and wherein the first current collector is in a contact with the battery housing;
wherein the first current collector, the separator, and the second current collector are stacked in a first direction, and the first current collector extends in a second direction beyond the separator, wherein the second direction is perpendicular to the first direction;
a second distance between the second current collector and the battery housing in the second direction is greater than a first distance between the separator and the battery housing in the second direction.

2. The battery according to claim 1, wherein the first current collector is coated with an active substance, and a coating range of the active substance on the first current collector does not extend in the second direction beyond the separator.

3. The battery according to claim 1, wherein the first current collector, the separator, and the second current collector are stacked and rolled by using a third direction as an axis; and
the first current collector extends in the third direction beyond the separator, and the first current collector conducts, in the third direction, heat to the battery housing through the contact between the first current collector and the battery housing.

4. The battery according to claim 3, wherein the first current collector is coated with an active substance, and a coating range of the active substance on the first current collector does not extend in the third direction beyond the separator.

5. The battery according to claim 1, wherein the first current collector is welded to an inner surface of the battery housing.

6. The battery according to claim 1, wherein the battery housing comprises a battery outer casing and a heat sink; and the heat sink is in a contact with an inner surface of the battery outer casing, and the first current collector is in a contact with the heat sink.

7. The battery according to claim 6, wherein the first current collector is welded to the heat sink.

8. An electrical apparatus, comprising:
an electrical load; and
at least one battery, wherein the battery comprises:
a battery housing,
a first current collector,
a separator, and
a second current collector, wherein the first current collector, the separator, and the second current collector are stacked and disposed inside the battery housing, wherein polarities of the first current collector and the second current collector are different, and the first current collector is in a contact with the battery housing, wherein the battery is electrically connected to the electrical load, and the battery is configured to supply power to the electrical load;
wherein the first current collector, the separator, and the second current collector are stacked in a first direction, and the first current collector extends in a second direction beyond the separator, wherein the second direction is perpendicular to the first direction;
a second distance between the second current collector and the battery housing in the second direction is greater than a first distance between the separator and the battery housing in the second direction.

9. The electrical apparatus according to claim 8, wherein the first current collector is coated with an active substance, and a coating range of the active substance on the first current collector does not extend in the second direction beyond the separator.

10. The electrical apparatus according to claim 8, wherein the first current collector, the separator, and the second current collector are stacked and rolled by using a third direction as an axis; and
the first current collector extends in the third direction beyond the separator, and the first current collector conducts, in the third direction, heat to the battery housing through the contact between the first current collector and the battery housing.

11. The electrical apparatus according to claim 10, wherein the first current collector is coated with an active substance, and a coating range of the active substance on the first current collector does not extend in the third direction beyond the separator.

12. The electrical apparatus according to claim 8, wherein the first current collector is welded to an inner surface of the battery housing.

13. The electrical apparatus according to claim 8, wherein the battery housing comprises a battery outer casing and a heat sink; and the heat sink is in a contact with an inner surface of the battery outer casing, and the first current collector is in a contact with the heat sink.

14. The electrical apparatus according to claim 13, wherein the first current collector is welded to the heat sink.

* * * * *